United States Patent

Holzapfel

[11] Patent Number: 6,076,757
[45] Date of Patent: Jun. 20, 2000

[54] TENSIONER DRIVE FOR A BELT RETRACTOR

[75] Inventor: Volker Holzapfel, Wendel, Germany

[73] Assignee: TRW Occupant Restraint Systems & Co. KG, Alfdorf, Germany

[21] Appl. No.: 09/281,499

[22] Filed: Mar. 30, 1999

[30] Foreign Application Priority Data

Mar. 31, 1998 [DE] Germany .................. 298 05 894 U

[51] Int. Cl.⁷ .................................................. B60R 22/46
[52] U.S. Cl. .................................................. 242/374
[58] Field of Search ........................ 242/374; 280/806; 297/478, 480; 60/632, 634, 638

[56] References Cited

U.S. PATENT DOCUMENTS 5,529,258  6/1996  Dybro et al. ........................ 242/374
5,681,004  10/1997  Specht ................................ 242/374
5,794,876  8/1998  Morizane et al. ................... 242/374

*Primary Examiner*—John M. Jillions
*Attorney, Agent, or Firm*—Tarolli, Sundheim, Covell, Tummino & Szabo L.L.P.

[57] ABSTRACT

A tensioner drive for a vehicular seat belt system has a compressed gas source and a turbine. The turbine has a housing and a turbine wheel with blades. The turbine wheel is rotatably supported in the housing and is surrounded by an annular space within the housing. The housing further has a plurality of nozzle openings distributed about the periphery of the annular space and directed therefrom towards the turbine wheel. The blades of the turbine wheel are exposed to pressure from the compressed gas source through the nozzle openings upon activation of the compressed gas source.

9 Claims, 4 Drawing Sheets

TENSIONER DRIVE FOR A BELT RETRACTOR

FIELD OF THE INVENTION

The invention relates to a tensioner drive for a belt retractor in vehicular safety restraint systems, comprising a compressed gas source and a turbine which can be exposed to the compressed gas source. The invention also relates to a belt retractor for vehicular safety systems comprising a belt reel and a belt tensioner.

BACKGROUND OF THE INVENTION

Tensioner drives for belt retractors are known. In German laid-open document 21 21 101, there is described a seat belt for motor vehicles with a belt retractor and a tensioner drive. When a predetermined deceleration value is exceeded, a compressed gas cartridge is ignited and the compressed gas developed by the cartridge acts upon a turbine wheel. The compressed gas emerging from the compressed gas cartridge is fed to the turbine wheel via a single duct running essentially tangentially to the circumference of the turbine wheel. The turbine and the duct are accommodated in a common housing.

German patent specification 26 18 119 C2 describes a tensioner drive for a belt retractor in which the explosion pressure of a propellant charge acts upon a free jet turbine. A liquid transmitting the explosion pressure of the propellant charge is arranged between the propellant charge and the turbine in a container or coiled pipe. The liquid escapes through a single nozzle at the end of the container or coiled pipe and acts upon the self-contained turbine wheel. The turbine wheel and the belt reel are arranged on a common shaft.

The German laid-open document DE 43 19 273 A1 describes a belt retractor for vehicular seat belt systems, with a rotary belt tensioner drive engaging the belt reel. An up-gearing planetary gear drive is arranged between the belt tensioner drive and the belt reel.

SUMMARY OF THE INVENTION

The object of the invention is to provide a tensioner drive for a belt retractor with high efficiency and a compact structure.

According to the invention, a tensioner drive for a vehicular seat belt system is provided which comprises a compressed gas source and a turbine. The turbine has a housing and a turbine wheel with blades which is rotatably supported in the housing. The turbine wheel is surrounded by an annular space within the housing. The housing further comprises a plurality of nozzle openings distributed about the periphery of the annular space and directed therefrom towards the turbine wheel. The blades of the turbine wheel are exposed to pressure from the compressed gas source through the nozzle openings upon activation of said compressed gas source.

According to the invention, also a belt retractor for vehicular safety systems is provided which comprises a frame, a belt reel and a belt tensioner with a tensioner drive according to the invention. The turbine wheel is drivingly coupled to the belt reel. The housing is joined to the frame of the belt retractor.

The provision of an annular space surrounding the turbine wheel, in conjunction with several nozzle openings directed towards the turbine wheel and emerging from the annular space, allows uniform loading of the turbine wheel with the compressed gases generated by the compressed gas source over several revolutions of the turbine wheel. By means of a simple and compact structure, uniform pressure conditions, which ensure a reliable starting and a high efficiency of the tensioner drive, can therefore be achieved at several nozzles distributed around the circumference of the turbine wheel. The turbine may be embodied as a free jet turbine, e.g. as a Pelton turbine. In the case of the belt retractor according to the invention, the tensioning length is not limited by the geometry of the component parts but only by the capacity of the compressed gas source. The drivingly coupled connection of the turbine wheel to the belt reel prevents any time delay at the beginning of the tensioning process.

In a further embodiment of the invention provision is made for the compressed gas source to be embodied in the form of an annular propellant generator which is arranged in the annular space. Such a design of the compressed gas source is advantageous in terms of a uniform pressure distribution on the several nozzle openings, and in terms of the compact structure of the tensioner drive.

As a further development it is proposed that the housing be split in the central plane of the turbine wheel, thus enabling the housing to be manufactured simply, since no undercuts are required when producing the annular space. The nozzle openings located in the central plane of the turbine wheel may also be produced very simply in this way.

In a further development of the invention provision is made that an igniter is arranged radially outside the annular propellant generator, the separation of annular propellant generator and igniter thus enabling safe installation of the tensioner drive.

As a further development it is provided that the housing has a turbine space and an exhaust gas space open to a lateral face of the housing, which exhaust gas space is connected to the turbine space by at least a first exhaust gas port. The system is therefore open, and only the dynamic pressure of the nozzles is used, with the result that no high excess pressures can develop inside the tensioner drive. This therefore obviates the need for precautions in terms of protecting the tensioner drive from bursting, nor are there any pressure peaks in different tensioning lengths, which would otherwise have to be neutralized by a bursting protection system. An exhaust gas space open towards a lateral face of the housing forms a damping volume for escaping compressed gas when it is fitted to the lateral face of the housing. A damping function can therefore be provided without any additional components.

In a belt retractor according to the invention it is advantageous that a down-gearing planetary gear is arranged within the force flow between the turbine wheel and the belt reel, the belt reel is mounted on a driven shaft of the turbine wheel, the driven shaft of the turbine wheel has an external toothing which meshes with at least one planet wheel, and that a ring gear of the planetary gear is arranged in a first belt reel flange. The high torques occurring during belt tensioning may be reliably transmitted by a planetary gear. The mounting of the belt reel on the driven shaft of the turbine wheel, whose toothing meshes with a planet wheel, and the arrangement of the ring gear of the planetary gear in a first belt reel flange provide an extremely compact belt retractor arrangement.

A further embodiment of the invention provides that a free-wheel brake is arranged in a second belt reel flange. A free-wheel brake prevents the belt wheel from being withdrawn after tensioning. The arrangement of the free-wheel brake in the second belt reel flange also contributes to a space-saving, compact structure.

Finally it is provided that a frame leg is arranged between the belt reel and the housing of the tensioner drive, that the at least one planetary wheel is mounted on a bearing part fitted to the side of the frame leg facing the belt reel, a cavity being formed between the bearing part and the frame leg, which cavity is connected with the outer surroundings by at least one exhaust gas opening, that the housing comprises a turbine space and an exhaust gas space which is open to a housing side facing the frame leg, which space is connected to the turbine space via a first exhaust gas opening, and that at least one second exhaust gas port is provided in the frame leg, which port makes connection between the exhaust gas space and the cavity. Such a design of the belt retractor provides a two-stage damping arrangement for escaping compressed gases, without additional components and in a compact arrangement. The exhaust gas port of the cavity can in this case communicate directly with the outside of the vehicle, so that the escaping compressed gases do not reach the interior of the vehicle.

BRIEF DESCRIPTION OF THE DRAWINGS

Further features and advantages of the invention read from the following description and from the drawings to which reference is made and in which.

DESCRIPTION OF PREFERRED EMBODIMENTS

Figure 1:
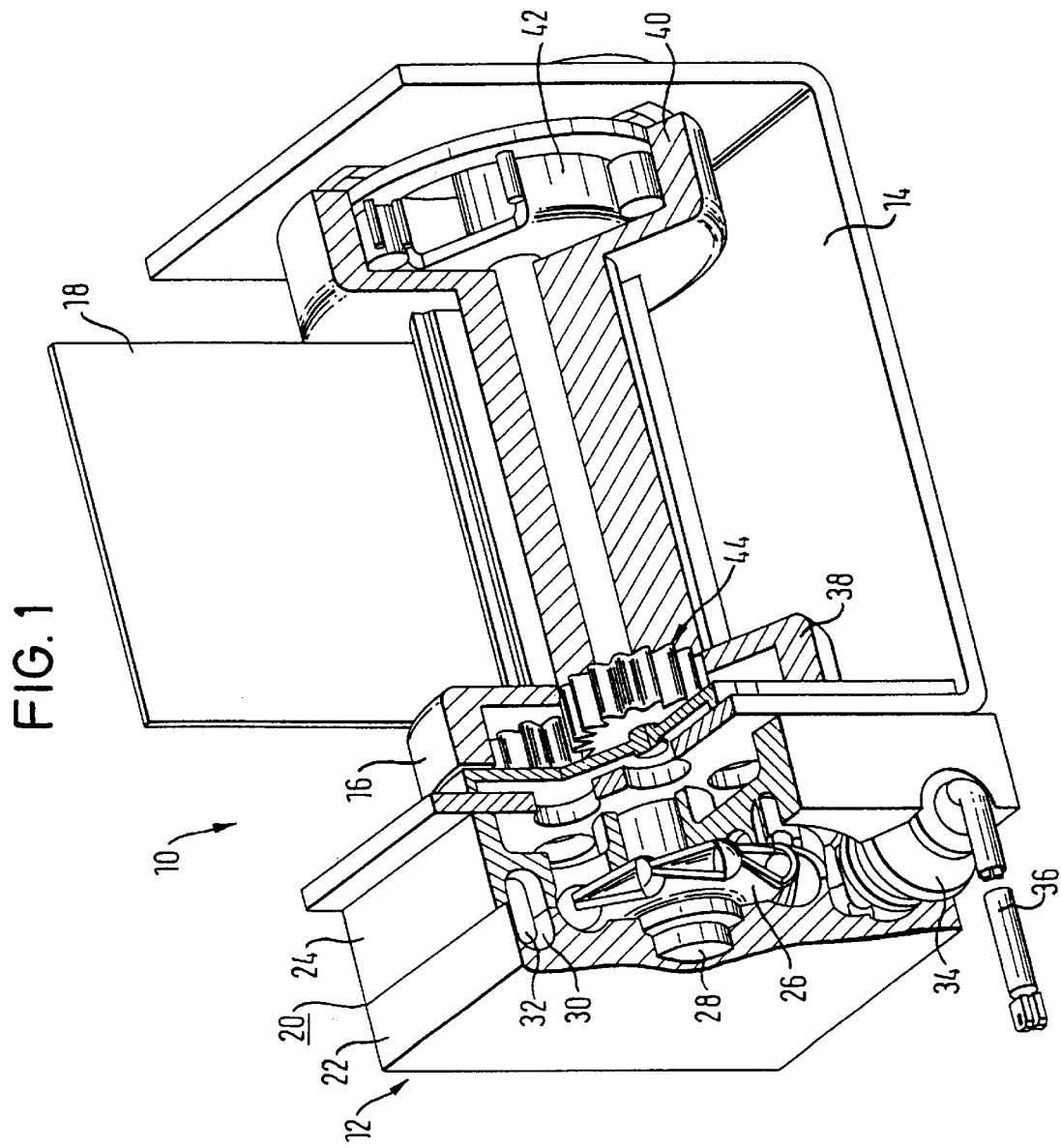
FIG. 1 shows a partially cut perspective view of a preferred embodiment of the belt retractor according to the invention.

The belt retractor 10, shown in FIG. 1, is provided with a tensioner drive 12. The belt retractor 10 has a U-shaped frame 14, between whose legs is arranged a belt reel 16 for receiving the belt 18. The tensioner drive 12 has a housing 20, which consists of two housing halves 22 and 24. A turbine wheel 26 is arranged inside the housing 20 on a driven shaft 28, which is in turn mounted in the housing 20. The turbine wheel 26 is surrounded by an annular space 30, in which is arranged an annular propellant gas generator 32. An igniter 34, which is arranged radially outside the annular propellant gas generator 32 in the housing 20, can be electrically activated by a connecting cable 36 and serves to ignite the annular propellant gas generator 32. The driven shaft 28 of the turbine wheel 26 extends through the U-shaped frame 14, and the belt reel 16 is rotatively mounted on the driven shaft 28. The belt reel 16 is provided at each of it axial ends with a flange 38 and 40 respectively, which ends each have a cylindrical recess concentric to the longitudinal axis of the belt reel 16. A free-wheel brake 42 of conventional construction is arranged in the flange 40 facing away from the tensioner drive 16, and a planetary gear 44, whose structure will be described in greater detail, is installed in the flange 38 of the belt reel facing towards the tensioner drive 12.

Figure 2:
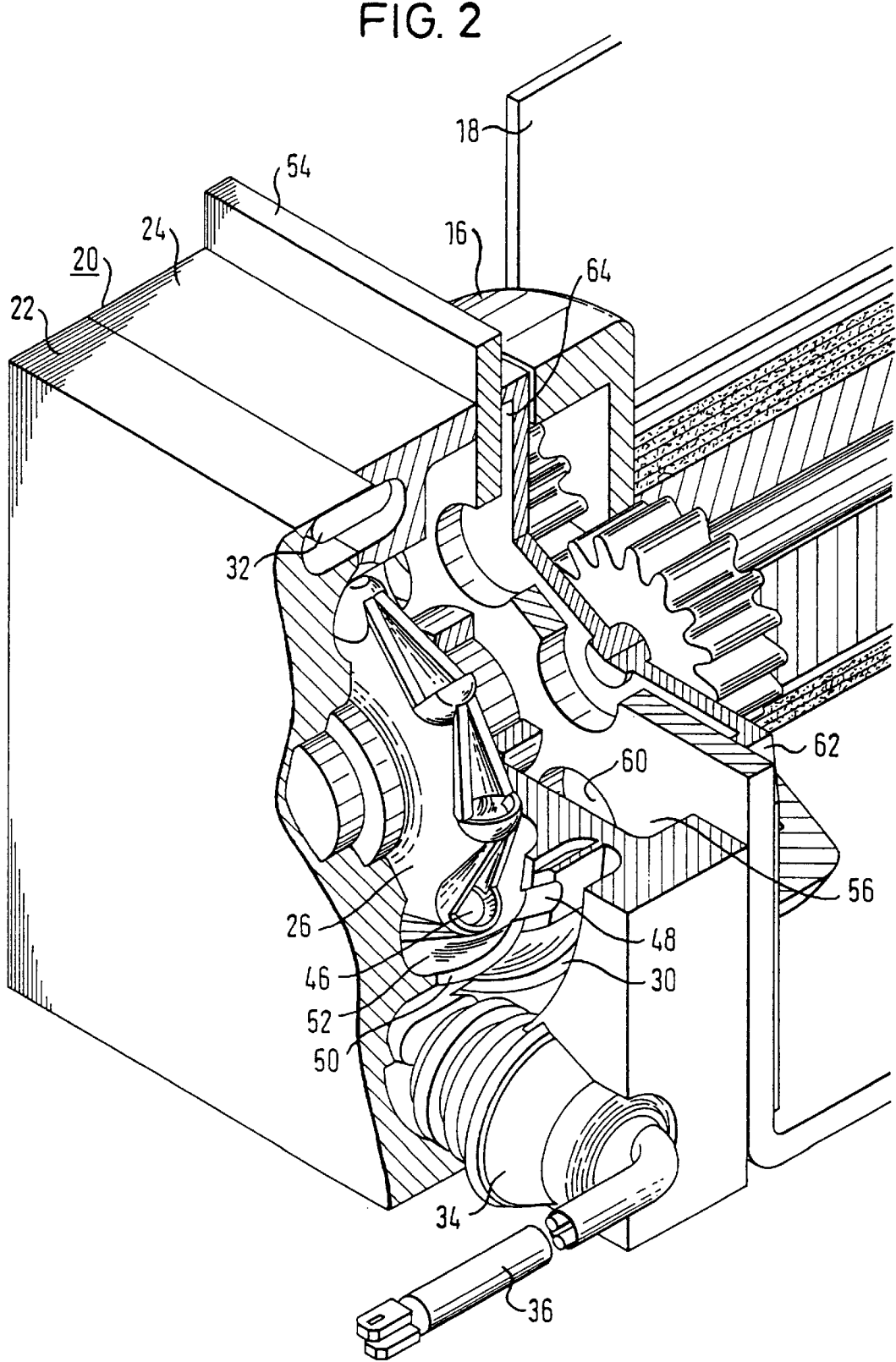
FIG. 2 shows a partial sectional view of the belt retractor of FIG. 1.

The enlarged representation in FIG. 2 shows a turbine wheel, which is provided on its periphery with blades 46. After the annular propellant gas generator 32 is activated, the blades 46 are exposed to compressed gas which expands in the annular duct 30 and is fed to the blades 46 via several nozzles 48. The nozzles 48 are distributed uniformly around the circumference of the turbine wheel 26 in a peripheral wall 50 which separates the turbine wheel 26 from the annular space 30. The two-piece structure of the housing 20 made up of the housing halves 22 and 24 is clearly shown in FIG. 2, and allows simple production of the annular space 30, the nozzles 48 and a turbine space 52, which receives turbine wheel 26. The driven shaft 28 is mounted in both housing halves 22 and 24. The housing half 24, arranged on the frame leg 54, is provided with an exhaust gas space 56 which is open towards the lateral face of the housing half 24 facing frame leg 54. The exhaust gas space 56 communicates with the turbine space 52 via several first exhaust gas ports 58, see FIG. 4. The frame leg 54 is provided with several second exhaust gas ports 60. A bearing part 62 is arranged on the side of the frame leg 54 facing belt reel 16, a cavity 64 being formed between bearing part 62 and frame leg 54. The cavity 64 communicates with the surrounding area via exhaust gas ports 66 formed in the bearing part 62, see FIG. 4. A two-stage damping arrangement is therefore provided by the exhaust gas space 56 and the cavity 64 for the compressed gases escaping from the turbine space 52 through the first exhaust ports 58. The tensioner drive 20 is provided with a Pelton turbine in the embodiment shown.

Figure 3:
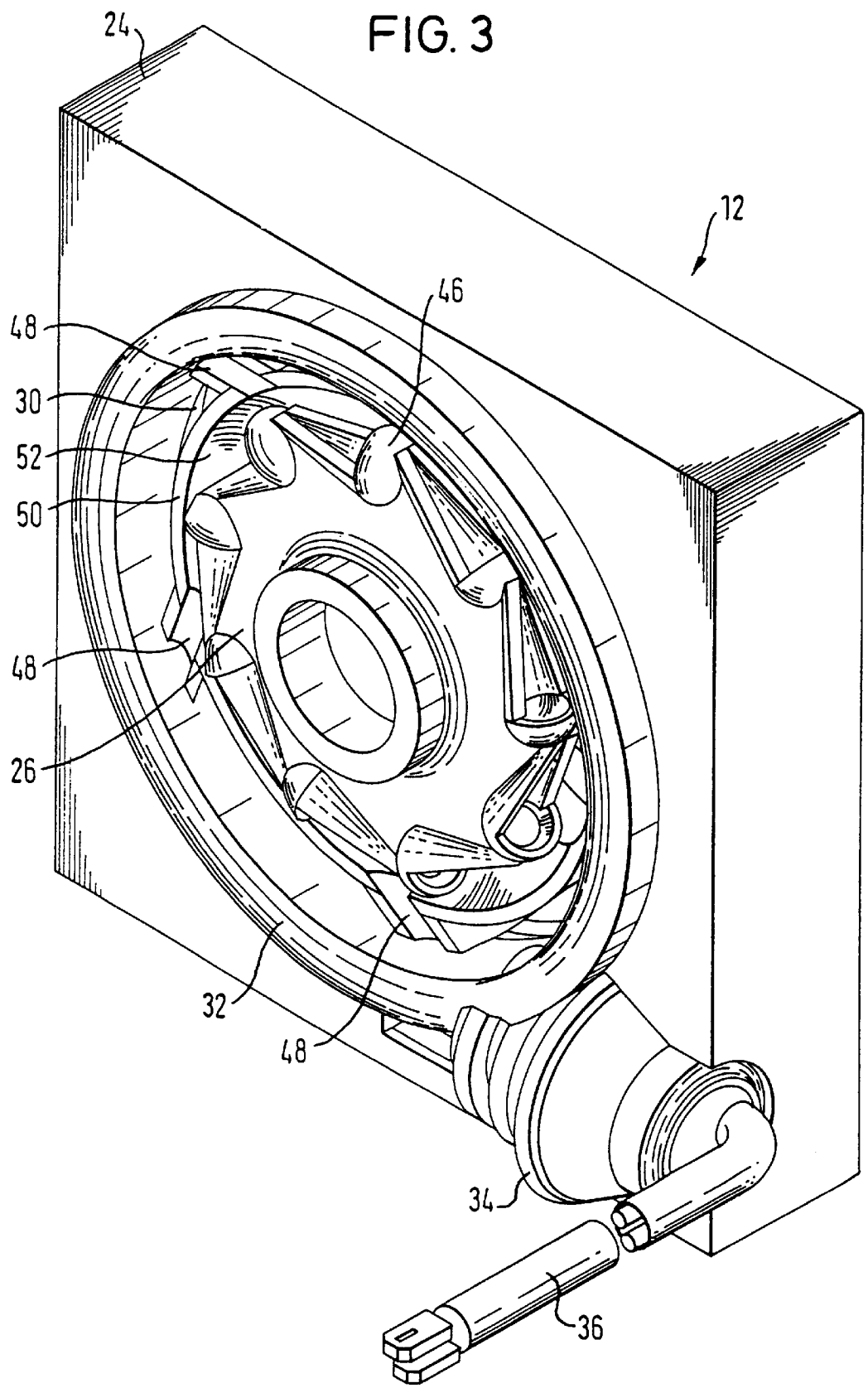
FIG. 3 shows the tensioner drive shown in FIGS. 1 and 2, with the front half of the housing removed.

FIG. 3 shows the tensioner drive 12, in which the front housing half 22, shown in FIG. 2, is removed. The annular propellant generator 32 is arranged in the half of annular space 30 which is formed in the housing half 24. In the peripheral wall 50, which separates the turbine space 52, in which the turbine wheel 26 is arranged, from the annular space 30, there are arranged several nozzle openings 48 which are uniformly distributed around the peripheral wall 50 in the peripheral direction. The nozzle openings 48 are in this case arranged obliquely to the peripheral wall 50 so that the compressed gas escaping through them hits the blades 46 of the turbine wheel in the intended direction of rotation. Since the annular propellant generator 32 does not completely fill the annular space 30, the compressed gases, developed after activation of the annular propellant generator 32 by the igniter 34, are allowed to distribute uniformly in the annular space 30. The compressed gases will therefore leave all nozzle openings 48 essentially at the same rate, thus ensuring uniform loading of the turbine wheel 26. The connecting cable 36 of the igniter 34 leads to a conventional triggering device.

Figure 4:
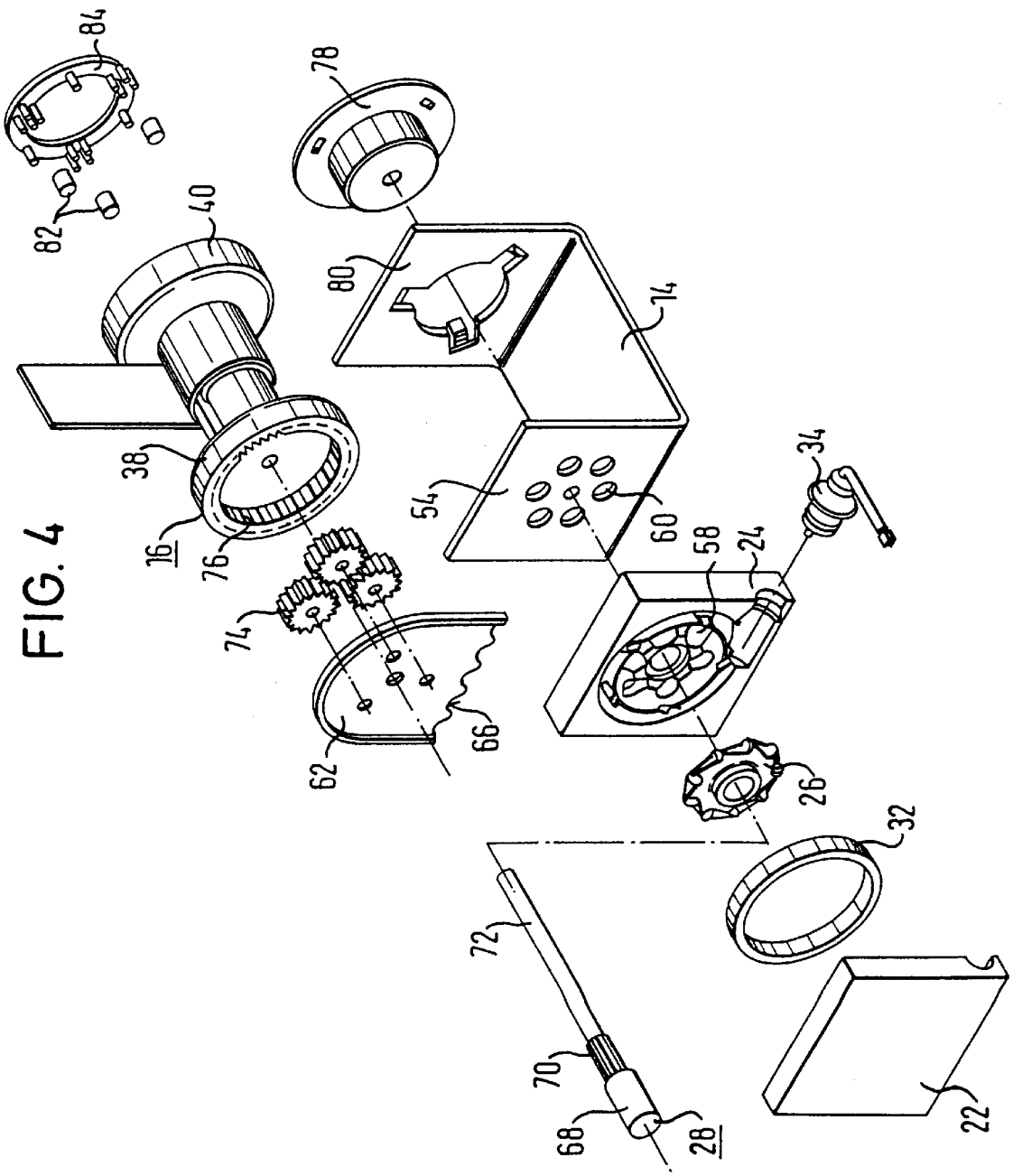
FIG. 4 shows an exploded view of the preferred embodiment of the belt retractor according to the invention.

FIG. 4 shows an exploded view of the belt retractor according to the invention. The driven shaft 28 of the turbine wheel 26 has a first section 68 to which the turbine wheel 26 is secured, and which is mounted in housing halves 22 and 24, respectively, on both sides of the turbine wheel 26. A second section of the driven shaft 28 is provided with an external toothing 70 and serves as the sun wheel of the planetary gear. A third section 72 of the driven shaft 28 extends through both legs of the frame 14 and serves to support the belt reel 16. The planetary gear consists of the external toothing 70 in the second section of the driven shaft 28, three planet wheels 74 and an internal toothing 76 in the belt reel flange 38, serving as a ring gear. The planet wheels 74 are rotatively mounted on the bearing part 62. The rotation of the driven shaft 28 is transmitted by the planetary gear via the external toothing 70, the planet wheels 74 and the internal gearing 76 to the belt reel 16, and in this case is geared down. As shown in FIG. 4, the housing half 24 facing the frame leg 54 is provided with six first exhaust gas ports 58. In alignment with them, six second exhaust gas ports 60 are arranged in the frame leg 54. The compressed gases generated in the annular propellant generator 32 and escaping from the turbine space through the first exhaust gas ports 58 cross the second exhaust gas ports 60, and finally escape into the atmosphere through the exhaust gas ports 66 in the bearing part 62. The flange 40 of the belt reel 16, opposing the planetary gear, serves to receive the conventional free-wheel brake. The free-wheel brake has a bearing part 78 which is arranged in a recess of the frame leg 80 and in which the third section 72 of the driven shaft 28 is mounted, as well as rollers 82 and a bearing cage 84.

What is claimed is:

1. A tensioner drive for a vehicular seat belt system, comprising a compressed gas source and a turbine having a housing, a turbine wheel with blades which is rotatably supported in said housing, said turbine wheel being separated from a continuous annular space surrounding said turbine wheel within said housing by a peripheral wall, said housing further comprising a plurality of nozzles distributed about the periphery of said annular space and extending therefrom through said peripheral wall towards said turbine wheel, said blades of said turbine wheel being exposed to pressure from said compressed gas source through said nozzles upon activation of said compressed gas source.

2. A belt retractor for vehicular safety systems, comprising a frame, a belt reel and a belt tensioner with a tensioner drive according to claim 1, said turbine wheel being drivingly coupled to said belt reel and said housing being joined to said frame of the belt retractor.

3. The belt retractor according to claim 2, further comprising a down-gearing planetary gear having at least one planet wheel and a ring gear, said belt reel comprising a first belt reel flange in which said ring gear is arranged, said turbine wheel further comprising a driven shaft having an external toothing, said toothing meshing with said at least one planet wheel.

4. The belt retractor according to claim 3, further comprising a free-wheel brake, said belt reel further comprising a second belt reel flange, the free-wheel brake being arranged in said second belt reel flange.

5. A tensioner drive for a vehicular seat belt system, comprising a compressed gas source and a turbine having a housing, a turbine wheel with blades which is rotatably supported in said housing, said turbine wheel being surrounded by an annular space within said housing, said housing further comprising a plurality of nozzle openings distributed about the periphery of said annular space and directed therefrom towards said turbine wheel, said blades of said turbine wheel being exposed to pressure from said compressed gas source through said nozzle openings upon activation of said compressed gas source, said compressed gas source being an annular propellant gas generator which is arranged within said annular space.

6. The tensioner drive according to claim 5, wherein said housing is split in a central plane of said turbine wheel.

7. The tensioner drive according to claim 5, further comprising an igniter, the igniter being arranged radially outside said annular propellant gas generator.

8. A tensioner drive for a vehicular seat belt system, comprising a compressed gas source and a turbine having a housing, a turbine wheel with blades which is rotatably supported in said housing, said turbine wheel being surrounded by an annular space within said housing, said housing further comprising a plurality of nozzle openings distributed about the periphery of said annular space and directed therefrom towards said turbine wheel, said blades of said turbine wheel being exposed to pressure from said compressed gas source through said nozzle openings upon activation of said compressed gas source, said housing having lateral faces and comprising a turbine space, an exhaust gas space and at least one first exhaust port, the exhaust gas space being open to one of the lateral faces of the housing and being connected to said turbine space by said at least one first exhaust port.

9. A belt retractor for a vehicular seat belt system, comprising a tensioner drive having a compressed gas source and a turbine having a housing, a turbine wheel with blades which is rotatably supported in said housing, said turbine wheel being surrounded by an annular space within said housing, said housing further comprising a plurality of nozzle openings distributed about the periphery of said annular space and directed therefrom towards said turbine wheel, said blades of said turbine wheel being exposed to pressure from said compressed gas source through said nozzle openings upon activation of said compressed gas source, said belt retractor further comprising a frame, a belt reel and a belt tensioner with said tensioner drive, said turbine wheel being drivingly coupled to said belt reel and said housing being joined to said frame of the belt retractor, said belt retractor further comprising a frame leg being arranged between said belt reel and said housing of the tensioner drive and having a side facing said belt reel, said frame leg comprising a bearing part having a first exhaust gas port, said housing having a side facing said frame leg and comprising a turbine space and an exhaust gas space, said bearing part being fitted to said side of the frame leg facing said belt reel at least one planet wheel being mounted on said bearing part, said cavity being formed between said bearing part and the frame leg and being connected with the environment by said at least one exhaust gas opening, said exhaust gas space being open to said housing side facing said frame leg and being connected to said turbine space via said first exhaust gas opening, and said second exhaust gas port making connection between said exhaust gas space and said cavity.

* * * * *